United States Patent Office 2,803,617
Patented Aug. 20, 1957

2,803,617

PROCESS OF PREPARING ORGANOPOLY-SILOXANE IN PARTICULATE FORM

Myron L. Corrin, Schenectady, N. Y., assignor to General Electric Company, a corporation of New York No Drawing. Application December 20, 1954,
Serial No. 476,545

5 Claims. (Cl. 260—37)

This invention relates to filler-containing organopolysiloxanes. More particularly, this invention relates to filler-containing organopolysiloxanes in particulate form, hereafter called "powder rubber," produced by polymerizing monocyclic organosiloxanes (hereafter called "cyclic organopolysiloxanes") in the presence of a solid filler and a ferric halide catalyst. This invention also relates to processes of curing these powders to a solid, elastic, infusible state and to processes of incorporating these powder rubbers as fillers in compositions convertible to elastomers. Furthermore, this invention relates to the novel products produced by the above processes.

Heretofore, ferric halides have been used as catalysts for preparing organopolysiloxanes which are convertible to the solid, elastic state. Such a process is found in U. S. Patent 2,448,756 which describes a method of preparing organopolysiloxanes from various methylpolysiloxanes using ferric chloride hexahydrate as the polymerization catalyst. But the products of the ferric-halide-organopolysiloxane polymerization described in the prior art have been viscous gums which are not easy to handle. In these processes, if one desires to add filler thereto, such addition is usually done during the milling operations. Yet, even with milling, it is difficult to obtain complete filler homogeneity in the gummy organopolysiloxane-filler composition. Since these filler-containing organopolysiloxanes usually are not converted immediately to the solid, elastic state, but often remain in storage for long periods of time, these compositions tend to develop "structure" on standing.

When organopolysiloxanes convertible (for instance, by heat in the presence of a curing agent or by radiation with high energy electrons) to the cured, solid, elastic state are mixed with certain fillers, especially certain finely divided silicas, such as silica aerogel, fumed silicas, precipitated silicas, etc., it will be found that on standing even for short periods of time, for instance, even as little as one day, the compounded material becomes tough and nervy. This toughness and nerve of the filled, curable organopolysiloxane, which is also known as "structure," are recognized by the presence of an undesirable snap and difficulty in rendering plastic the rubber compound by usual mechanical working. These undesirable characteristics may occur even while these particular types of fillers are being added on suitable equipment to the aforementioned convertible organopolysiloxane. After incorporation of these structure-inducing fillers in the convertible organopolysiloxane, it will also be found that after the filled compound is stored for any length of time, for instance, from about 2 days to several months, this toughness and nerve increased to such a point that excessive milling times are required to form a plastic continuous film around the faster roll of a 2-roll differential mill (whose rolls are operating at different speeds) normally used for rendering the stored compound plastic prior to further processing of the latter. This inability to obtain a plastic film in a short period of time is due to the fact that the compound on the rolls will not knit readily within a reasonable period of time. In some instances the curable, filled compound will not knit at all even after long periods of milling and it is often impossible to attain a satisfactory plastic ( i. e., soft, pressure-flowable) condition with the result that the latter condition requires discarding the filled compound with obvious economic losses. The term "knit" referred to in the present description is intended to mean the ready fusing of the laps and folds of a vulcanizable silicone rubber stock to form a continuous, homogeneous, textured sheet during milling. A more complete definition of this knitting property is disclosed in the book, "The Vanderbilt 1948 Rubber Handbook," page 79, ninth edition, published in 1948 by the R. T. Vanderbilt Company, 230 Park Avenue, New York, New York.

I have found that the difficulties present in the products of the prior art, namely, gummy viscosities and "structure," can be eliminated by using the powder rubbers herein described. I have discovered that powder rubbers can be prepared by polymerizing cyclic organosiloxanes in the presence of a filler and a ferric halide catalyst, which powder, upon milling and curing, yields an elastomer having high temperature heat stability. This free flowing powder, containing both organopolysiloxane and filler, offers advantages in manufacture, handling, storage and transportation not possessed by highly viscous gums. Because polymerization takes place directly on the filler particles, a more homogeneous and a higher filler-gum ratio can be obtained than is possible by compounding filler into a viscous organopolysiloxane gum. Furthermore, since there is no problem of "structure," the powder rubber can be stored indefinitely without adverse effects on its properties.

In general, the process is carried out by heating a mixture of a (1) cyclic organosiloxane, (2) a solid filler, and (3) catalytic amounts of ferric halides. The product of this reaction is a free flowing powder that can be changed to a plastic mass upon milling. After being milled to a plastic rubber sheet, it can be cured to the solid, elastic state by such procedures as peroxide cure, irradiation, etc., in the manner of the usual organopolysiloxane gums.

The cyclic organosiloxanes, within the scope of this invention, are materials which contain alternate silicon and oxygen atoms and which have organic radicals linked to the silicon atoms by carbon-to-silicon bonds. The organosiloxanes which are employed as the raw materials in this process are the completely condensed cyclic organosiloxane of the general formula $(R_2SiO)_n$ where $n=a$ whole number greater than 2, and R represents a hydrocarbon or a halohydrocarbon radical selected from the class consisting of alkyl radicals, e. g., methyl, ethyl, butyl, isobutyl, octyl, etc., radicals; cycloalkyl radicals, e. g., cyclohexyl, cycloheptyl, etc., radicals; aryl radicals, e. g., phenyl, diphenyl, etc., radicals; aralkyl radicals, e. g., tolyl, xylyl, ethylphenyl, etc., radicals; alkaryl radicals, e. g., benzyl, phenylethyl, etc., radicals; haloaryl radicals, e. g., chlorophenyl, dibromophenyl, etc., radicals; and mixtures of the aforesaid members, at least 50 mol percent of said members being methyl radicals.

By completely condensed cyclic organosiloxanes, I mean those compounds which are not subject to further increase in polymeric molecular weight without rupturing the siloxane ring. Compounds of this kind are desirable starting materials for the production of polymers inasmuch as they exist as well-defined compounds which can be purified by crystallization, distillation and like methods. These compounds are of low average molecular aggregations, preferably of 3–12 silicon atoms per molecule. Mixtures of these cyclic organosiloxanes as well as substantially pure individual cyclic organosiloxanes, such as the preferred octamethylcyclotetrasiloxane, can be employed in this invention. For example, mixtures of compounds having the same number of cyclic siloxane units but different silicon-bonded organic groups or mixtures of compounds having various cyclic organosiloxane units (trimer, tetramer, pentamer, etc.) while containing the same or different silicon-bonded organic groups.

The preparation of cyclic dialkylsiloxanes and cyclic alkyl-aryl siloxanes is described by Hyde and De Long, JACS 63, 1194 (1941).

Among the fillers within the scope of this invention are silicas, such as silica xerogel, silica aerogel, fumed silica, etc., titanium dioxide, calcium silicate, ferric oxide, chromic oxide, cadmium sulfide, aluminum oxide, calcium silicate, asbestos glass fibers, calcium carbonate, carbon black, lithopone, talc, diatomaceous earth, hydrophobic silicas, etc. Such fillers that impart strength, toughness, and high stretch, etc., to organopolysiloxane elastomers are described in U. S. Patents 2,460,795 and 2,541,137. High surface area fillers are desirable, i. e., those fillers possessing a surface area of at least 1 square meter per gram, preferably over 75 meters per gram. Mixtures of fillers may also be used.

The preparation of high surface area silicas and the chemical changes that occur when silicic acid goes to silica gel or hydrated silica are described in "Natural and Synthetic High Polymers," by K. M. Meyer, page 85 (1942), and in Hurd, Chemical Reviews, vol. 22, No. 3, page 403 (1938).

A class of silicas useful for my invention are those having numerous pores or voids therein. These porous materials having exposed surfaces within the particles so that liquids and gases can penetrate to the surfaces of the pore walls are three-dimensional networks whose surfaces are extended by open pores.

Silicas useful for this invention are those that have high "specific surface areas" of from 1–900 square meters per gram. By this term, I mean the ratio of surface area, expressed in square meters, to the weight of 1 gram of the corresponding sample (i. e., meters per gram). Two methods can be used for determining "specific surface area": (1) by nitrogen adsorption, as described by Holmes et al., Journal of Physical and Colloid Chemistry 51, 1262 (1947), and (2) by the electron microscopic photographs, by the method of Watson, Analytical Chemistry 20, 576 (1948). Since all points of contact may not be visible in the electron micrograph because silica is a three-dimensional polymer, there may be a difference between the ratios determined by these 2 methods. The degree of unseen coalescence is expressed as $S_c/S_n$ where $S_c$ is the surface area as determined by electron micrograph and $S_n$ is the surface area as determined by nitrogen adsorption.

A typical method of preparing silica aerogels comprises precipitating silica by the addition of $H_2SO_4$ to a sodium silicate solution and working the gel relatively free of salts with water. If the water is evaporated from the gel in this state, the latter shrinks considerably in volume due to the force exerted on the solid phase of the gel by the surface tension of the liquid as it recedes in the pores of the material. These materials, which are called xerogels, can be used in this process.

In contrast to xerogels, aerogels are composed of the original solid phase gel in substantially the same condition as while filled with the swelling liquid. Aerogels are conveniently made by raising the gel to the critical temperature of the liquid contained therein while maintaining the pressure on the system sufficiently high to insure that the liquid phase will remain liquid until the critical temperature is reached. At this point, the liquid will be converted into the gaseous state without the formation of menisci at the gas-liquid interface. The degree of porosity may be controlled to a large degree by controlling the concentration of the silica in the gel as it is precipitated. These aerogels may be used in this condition or they may be ground to a finer state of subdivision.

An example of an aerogel is Santocel-C marketed by Monsanto Chemical Company which has a specific surface area of about 160 square meters per gram. Another silica powder employed is that produced by Linde Air Products Company and described in Chemical Engineering 54, 177 (1947), which silica has a specific surface area of 240 square meters per gram.

Silicas prepared by other methods may also be used. An example of a fumed silica (i. e., prepared from burning $SiCl_4$) is "Aerosil" which has a surface area of about 200 square meters per gram. (Godfrey Comapny, Inc., Boston, Massachusetts.)

In contrast to the above-described hydrophilic silicas (i. e., possessing water affinity) are those silicas which have been rendered hydrophobic by chemical treatment, examples of which are the alkyl surface-esterified type described in U. S. Patent 2,657,149 of which the butyl ester is marketed as G. S. Silica by Du Pont Chemical Company and silicas which have been treated with various alkyl chlorosilanes in the manner of U. S. Patents 2,510,661, 2,563,555 and 2,584,085.

If hydrophilic fillers are used in the preparation of the powder rubbers of my invention, the original nature of the filler is changed from a hydrophilic to a hydrophobic state. Although the original filler could be dispersed when stirred into boiling water, the powder rubber prepared from this filler floated on the surface when tested in the same manner. The hydrophobic nature of the powder rubber was unchanged after being heated in a test tube for 10 minutes over a Bunsen flame, thus indicating its thermal stability. After heat treatment, the powder rubber was still a powder and still floated when stirred into boiling water.

Hydrophobic powder rubber can be incorporated as fillers into organopolysiloxane and hydrocarbon gums which gums are convertible to elastomers. Due to the hydrophobic nature of powder rubber, improved surface properties are obtained so that larger amounts may be homogeneously incorporated into these gums during the milling operation than is possible with the usual hydrophilic fillers.

Another type of filler that can be used is alumina, high surface area alumina being preferred. Among these high surface area compounds are such aluminas as (1) hydrated aluminum oxide (C-730) made by Aluminum Company of America which comprises 34.7% combined water and 64.4% $Al_2O_3$ (chemically aluminum trihydrate) and is of an average particle size of about 0.5 micron, (2) activated (dehydrated) aluminum oxide which is dehydrated C-730 obtained by heating for 64 hours at 480° F. to remove 28% of the combined water, (3) activated (dehydrated) alumina produced by calcining at elevated temperatures to remove essentially all the combined water, (4) alpha alumina, made by Linde Air Products Company, average particle size of about 0.3 micron, (5) gamma alumina, such as Alon I, manufactured by Godfrey L. Cabot, Inc., of Boston Massachusetts.

Gamma alumina ($Al_2O_3$) having a certain crystalline structure is prepared in such a way that it is different from most of the common aluminum oxides now available. One method of preparing gamma alumina is to vaporize the anhydrous aluminum chloride by heating it, said heating being carried out with natural gas. The water formed as a result of the combustion hydrolyzes the aluminum chloride in the vapor state, which at a temperature of about 500° F. (which characterizes the low temperature designation of the gamma alumina) dehydrates and converts to a fine particle size gamma aluminum oxide which is then collected and freed of excess hydrogen chloride. The average particle size of this particular alumina (as shown by agreement between electron microscope examination and nitrogen adsorption methods) is very small and is for the most part less than about 100 millimicrons in size, average particle size being from about 20 to 40 millimicrons. The particles are generally of uniform size and shape and the surface area of the gamma alumina is within the range of from about 40 to 130 square meters per gram. Another method for making this gamma alumina is to vaporize anhydrous aluminum chloride and hydrolyze it in the vapor state with high temperature steam, whereby the actual hydrolysis takes place preferably at around 500° F. The gamma alumina, having a hazy X-ray gamma structure, undergoes a change to a sharp gamma structure as the temperature is raised progressively up to around 900° C., where a transition to a sharp alpha pattern takes place. More detailed information regarding gamma alumina may be found disclosed in the article by M. H. Jellinek and I. Fankucehn, "X-ray Diffraction Examination of Gamma Alumina," in Industrial and Engineering Chemistry, page 158, February 1945. The use of gamma alumina as a filler in organopolysiloxane gums is described in U. S. Patent 2,671,069.

Although a large number of catalysts have been employed in polymerizing cyclic organosiloxanes, the ones usually used are alkali metal hydroxides. When octamethylcyclotetrasiloxane, hereafter called tetramer, was polymerized in the presence of silica aerogel using potassium hydroxide as catalyst, a gum was obtained, as expected from the prior art. Substituting aluminum oxide for silica aerogel in the potassium hydroxide polymerization of the tetramer also yielded the expected gum. But, unexpectedly, when tetramer was polymerized in the presence of a filler using ferric halide as a catalyst, a powder in lieu of a gum was produced. The ferric halides that can be used are ferric chloride, ferric bromide, and ferric iodide, but preferably ferric chloride.

The amount of ferric halide catalyst that can be advantageously employed is from 0.01–5% by weight based on tetramer, but preferably 0.1–1%. Both hydrated and anhydrous ferric halides can be used. Greater amounts of catalyst may be used but their presence in the final product presents a problem of contamination and possible instability of the product, particularly under hydrolytic conditions.

The temperature employed in polymerizing cyclic organosiloxanes to the powder rubber of this invention can vary from about 100° C. to below the decomposition point of the organopolysiloxane. Although this polymerization proceeds at a practical rate between 100–200° C., I prefer to carry out the reaction between 150–190° C. In practice, it may be advantageous to start the reaction at the boiling point of the cyclic organosiloxane (175° C. in the case of the tetramer) and then allow the temperature to rise to about 200° C. A good reflux condenser should be used to prevent loss of the cyclic organosiloxane. Loss of the starting material is no problem when the polymerization is carried out under superatmospheric pressure. Within the broad temperature range, the polymerization time is from 3–100 hours, but preferably 20–60 hours.

Higher filler loadings are possible with this invention than are possible in polymerizations where the filler is added to the organopolysiloxane gum during the milling operation. Not only is greater loading possible but a more homogeneous dispersion is obtained than is possible in the conventional processes. Compositions containing 2 parts or more by weight of filler based on weight of the cyclic organosiloxane can be polymerized, milled and subsequently cured to produce rubbers of good tensile strengths. The preferred range of filler to cyclic organosiloxane is from 0.1–1 part, based on weight.

In order that those skilled in the art may better understand how the present invention may be practiced, the following examples are given by way of illustration and not by way of limitation.

EXAMPLE 1

A mixture of 45 grams of silica aerogel (Santocel-C), 200 grams of octamethylcyclotetrasiloxane (tetramer) and 0.45 gram of ferric chloride was heated at 150° C. for 3 hours to yield a free flowing powder. Two grams of benzoyl peroxide were added to the plastic mass prepared by milling this powder in a rubber mill. The resulting composition was press-cured at 125° C. for 20 minutes and then placed in a 150° C. oven. After 16 hours at this temperature, the resulting elastomeric product had a tensile strength of 600 p. s. i. and an elongation of 250%.

In contrast, a viscous gum was produced when 200 grams of tetramer were heated at 150° C. for 3 hours in the presence of 0.45 gram of anhydrous ferric chloride as catalyst in the absence of filler.

EXAMPLE 2

A mixture of 20 grams of silica aerogel (Santocel-C), 75 grams of tetramer and 0.078 gram of $FeCl_3$ was heated at 175–190° C. for 20 hours. The free flowing powder obtained was milled in a rubber mill to form a rather tacky sheet. After benzoyl peroxide (0.48 gram) was milled into this sheet, the composition was press-cured for 20 minutes at 125° C. followed by an oven cure of 24 hours at 150° C. The elastomeric product had a tensile strength of 723 p. s. i. and an elongation of 200%.

EXAMPLE 3

A mixture of 90 grams of silica aerogel (Santocel-C), 200 grams of tetramer and 0.6 gram of ferric chloride was heated at 175–190° C. for 21 hours. The free flowing powder obtained was milled in a rubber mill forming a tacky sheet. After benzoyl peroxide (1.65 grams) was milled into this sheet, the composition was press-cured at 125° C. for 20 minutes followed by 16 hours at 150° C. in an oven. The elastomeric product had a tensile strength of 820 p. s. i. and an elongation of 200%.

EXAMPLE 4

A methyl silicone gum having a viscosity of 500,000 centipoises was prepared by heating tetramer with 0.01% by weight of KOH at 150° C. for 6 hours. Fifty grams of powder rubber containing 1 part of silica aerogel to 1 part of tetramer and 0.5 gram of $FeCl_3$, prepared in the manner of the powder in Example 1, were milled into 50 grams of this gum, together with 1.65 grams benzoyl peroxide. This resulting gum was press-cured at 125° C. for 20 minutes followed by 16 hours at 150° C. The elastomeric product had a tensile strength of 730 p. s. i. and an elongation of 500%.

In a similar manner, the powder rubber of this invention can be incorporated into other organopolysiloxane gums, such as those described in U. S. Patent 2,684,349 and cured to a solid, elastic state.

EXAMPLE 5

Anhydrous ferric chloride dispersed in tetramer was mixed with silica aerogel in a reactor which was maintained at 150±2° C. The dispersion was mixed so that the silica was completely wetted.

All samples were compounded with 1.65 grams of benzoyl peroxide per 100 grams of the tetramer originally used. The procedure was to close the mill rolls to a small opening and pour on the powder rubber. A sheet formed immediately. Benzoyl peroxide was then added and the compound milled to insure peroxide dispersion. The samples were given a press cure between flat plates using 50 mil shims of 20 minutes at 125° C. and an oven cure of 24 hours at 150° C. in a circulating air oven. The oven aging was done in a 250° C. circulating air oven.

In no instance was anything resembling "structure" observed even though the powder rubbers remained in air for several days. The compounds that had been milled were rather soft and pasty before curing.

*Results.*—The effects of varying the tetramer/Santocel-C weight ratio (*T/S*), of varying the FeCl₃ concentration and the effect of varying the heating time are shown in Table I. These data were obtained after the 24-hour, 150° C. oven cure.

*Table I.—Summary of data in the tetramer-Santocel-C-FeCl₃ system*

| Sample No. | Percent FeCl₃ Based on Tetramer | Polymerization Time In Hours | T/S Weight Ratio Tetramer to Silica | Tensile (p. s. i.) | Elongation (percent) |
|---|---|---|---|---|---|
| 1 | 0.4 | 20 | 1.25 | 595 | 100 |
| 2 | 0.6 | 20 | 1.25 | 585 | 100 |
| 3 | 0.2 | 20 | 1.85 | 505 | 100 |
| 4 | 0.2 | 60 | 1.85 | 684 | 250 |
| 5 | 0.4 | 20 | 1.85 | 705 | 200 |
| 6 | 0.4 | 60 | 1.85 | 710 | 200 |
| 7 | 0.6 | 20 | 1.85 | 674 | 175 |
| 8 | 0.6 | 60 | 1.85 | 488 | 150 |
| 9 | 0.4 | 20 | 2.5 | 274 | 300 |
| 10 | 0.4 | 60 | 2.5 | 842 | 200 |
| 11 | 0.6 | 20 | 2.5 | 834 | 300 |
| 12 | 0.6 | 60 | 2.5 | 496 | 200 |

The data indicate that the results are insensitive to the concentrations of ferric chloride and to the polymerization time.

The heat aging data of Table II indicate that there seems to be no marked effect on the tensile strength as filler loading is increased. Independent of loading, the tensile is about 800 pounds per square inch. Samples appearing in Table I are similarly numbered in Table II.

*Table II.—Heat aging of rubber samples*

| No. of Samples in Table I | | Days at 250° C. | | | | |
|---|---|---|---|---|---|---|
| | | 1 | 2 | 3 | 4 | 5 |
| 1 | Tensile (p. s. i.) | 660 | 760 | 850 | 845 | |
| | Elongation (percent) | 100 | 75 | 75 | 75 | |
| | Wt. loss (percent) | 1.6 | 2.3 | 3.1 | 3.5 | |
| 2 | Tensile (p. s. i.) | 830 | 840 | | | |
| | Elongation (percent) | 75 | 75 | | | |
| | Wt. loss (percent) | 1.7 | 2.2 | | | |
| 4 | Tensile (p. s. i.) | 690 | 670 | 820 | 720 | 880 |
| | Elongation (percent) | 150 | 100 | 100 | 100 | 100 |
| | Wt. loss (percent) | 1.9 | 2.4 | 3.2 | 4.0 | 4.3 |
| 8 | Tensile (p. s. i.) | 720 | 630 | 820 | 740 | |
| | Elongation (percent) | 150 | 75 | 75 | 75 | |
| | Wt. loss (percent) | 1.6 | 2.9 | 3.3 | 3.5 | |
| 9 | Tensile (p. s. i.) | 680 | 450 | 740 | 800 | 640 |
| | Elongation (percent) | 300 | 150 | 150 | 150 | 150 |
| | Wt. loss (percent) | 1.7 | 3.2 | 3.6 | 4.1 | 4.8 |
| 11 | Tensile (p. s. i.) | 720 | 790 | 820 | 850 | |
| | Elongation (percent) | 200 | 100 | 100 | 100 | |
| | Wt. loss (percent) | 2.5 | 4.5 | 5.5 | 6.0 | |

EXAMPLE 6

Aluminum oxide (Alon I) and diatomaceous earth (Celite, Johns-Manville Co.) were used as fillers in place of silica in the following preparations:

A composition having 50 grams of tetramer, 54 grams of filler and 0.3 gram of FeCl₃ was polymerized for 20 hours at 150° C. to yield a powder rubber. This powder after being milled to a plastic sheet and compounded with 1.65 grams of benzoyl peroxide was pressed for 20 minutes at 125° C. and oven-cured for 24 hours at 150° C. to yield an elastomeric product.

The physical properties of the elastomeric product prepared from diatomaceous earth during heat-aging are given in the following table.

*Table III.—Aging of Celite powder rubber*

| Heat Treatment | Tensile (p. s. i.) | Elongation (percent) | Tear (p. s. i.) |
|---|---|---|---|
| 24 hrs. at 150° C | 937 | 100 | 45 |
| 24 hrs. at 250° C | 905 | 100 | 47 |
| 48 hrs. at 250° C | 1,010 | 50 | 72 |

Various curing agents can be used to effect the rapid conversion of milled powder rubber to the cured solid elastic state. Among such curing agents are, for instance, benzoyl peroxide, tertiary butyl perbenzoate, etc. These curing agents can be present in amounts ranging from about 0.1 to as high as 4–8% or more by weight based on the weight of tetramer. High energy electron irradiation without curing agents may also be employed for vulcanization purposes.

Although the compositions herein described offer such advantages in manufacture, handling, storage and transportation, they can, when desired, be converted into solid elastic organopolysiloxanes in the manner of the unusual organopolysiloxane gums. The significance of abolishing "structure" lies in the ability to readily plasticize a filled organopolysiloxane within a commercially feasible time by mechanical action or suitable equipment after the compound has been stored for long periods of time and to use it thereafter in those applications for which organopolysiloxanes are normally used.

After being converted to an uncured rubber sheet upon milling, they can advantageously be employed in extrusion, molding and calendering applications. Alternately, these compositions after being milled can be dissolved and/or dispersed in suitable solvents or dispersing agents, such as toluene, xylene, butanol, etc., and be used for coating and impregnating purposes, for coating glass tape, glass fibers, glass fiber sheets, asbestos cloth, etc. In the latter instance, glass cloth can be coated with the milled powder rubber herein described containing filler and curing agent and thereafter the coated cloth can be wrapped around mandrels to make heater ducts and then cured under heat and pressure to give unitary structures having outstanding heat resistance. Milled powder rubber containing curing agents can be readily extruded over electrical conductors and heat-treated at elevated temperatures to obtain a smooth, coherent, cured insulation having outstanding thermal stability. Powder rubber can also be incorporated into organopolysiloxane gums prepared by the usual methods thus leading to excellent dispersion of the filler particles therein. Fillers prepared in this way with a relatively small amount of tetramer display improved surface properties when incorporated into organopolysiloxane gum during the milling operation.

Thus, cured products prepared by this invention yield silicone rubber which can be used as tubing, electrical insulation, shock absorbers, gaskets for high temperature operations, etc. They are valuable as materials for use in applications where natural or other synthetic rubbers may fail owing to the deleterious effect to extreme heat or cold.

What I claim as new and desire to secure by Letters Patent of the United States is:

1. A process of preparing filler-containing organopolysiloxanes in particulate form which comprises polymerizing a monocyclic organosiloxane wherein the organo groups are selected from the group consisting of hydrocarbons and halohydrocarbon radicals in the presence of a solid filler possessing a surface area of at least 1 square meter per gram and about 0.1–5% by weight of a ferric halide catalyst based on weight of said monocyclic organopolysiloxane, said filler being present prior to polymerization.

2. The process of claim 1 in which the monocyclic organosiloxane is octamethylcyclotetrasiloxane and the ferric halide is ferric chloride.

3. The process in claim 2 in which the filler is silica.

4. The process of claim 2 in which the filler is a diatomaceous earth.

5. The process of claim 2 in which the filler is alumina.

References Cited in the file of this patent

UNITED STATES PATENTS

| | | |
|---|---|---|
| 2,430,032 | Scott | Nov. 4, 1947 |
| 2,448,756 | Agens | Sept. 7, 1948 |